May 15, 1945.   R. R. SMITH   2,375,955
APPARATUS FOR PRODUCING SOLID OR HOLLOW PELLETS
Filed Sept. 7, 1942
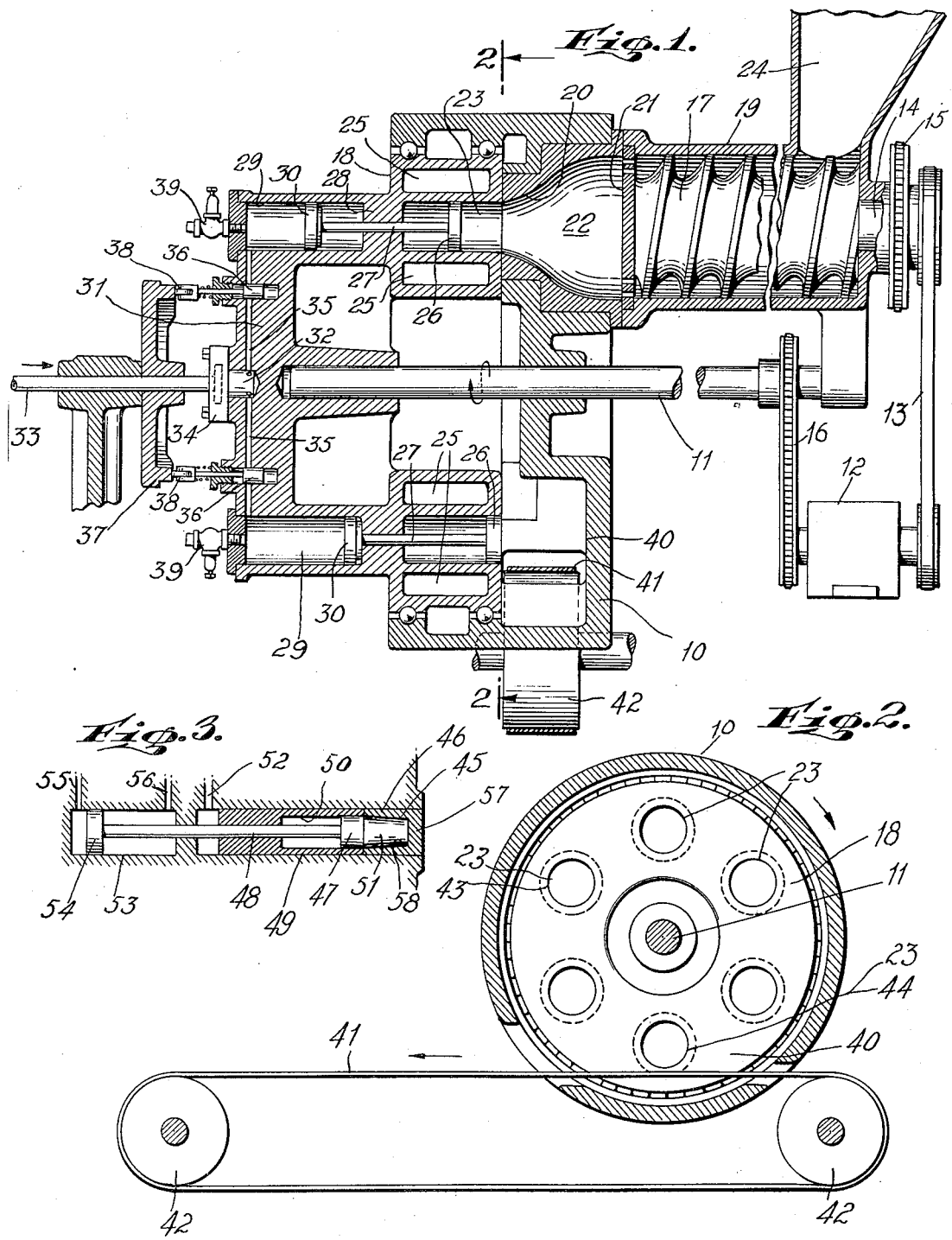
INVENTOR
ROGER R. SMITH
BY
ATTORNEY Patented May 15, 1945

2,375,955

UNITED STATES PATENT OFFICE 2,375,955

APPARATUS FOR PRODUCING SOLID OR HOLLOW PELLETS

Roger R. Smith, Gardner, Mass.

Application September 7, 1942, Serial No. 457,618

7 Claims. (Cl. 18—30)

This invention relates to the production of solid or hollow pellets from plastic materials. More particularly, the invention relates to apparatus for producing extruded products of this kind in a more or less continuous process, means being employed to control and regulate the size of the product and for automatically ejecting the product onto a conveyor. The novel features of the invention will be best understood from the following description when taken together with the accompanying drawing, in which certain embodiments of the invention are disclosed, and in which the separate parts are designated by suitable reference characters in each of the views, and in which:

Fig. 1 is a diagrammatic or schematic sectional view through an apparatus for carrying my improved method into effect and illustrating one adaptation of the invention and with parts of the construction broken away.

Fig. 2 is a section substantially on the line 2—2 of Fig. 1, but showing the conveyor diagrammatically in elevation, and Fig. 3 is a sectional detail view diagrammatically showing another adaptation of the invention.

In Fig. 1 of the drawing, I have shown at 10 a frame, centrally of which is arranged a drive shaft 11, driven, in the construction shown, through a "Reeves" variable drive indicated at 12, the drive being actuated by a chain or belt, indicated generally at 13, a belt being shown in the drawing which takes off from a worm shaft 14, the latter being driven by a chain and sprocket 15 from a suitable source of power. The drive 12 is also coupled with shaft 11 through a chain and sprocket structure 16. At this time, it will be understood that any type and kind of drive may be employed, but in most instances it will be desirable to maintain a predetermined synchronism between the actuation of the feed worm 17 and a rotating cylinder plate 18.

The worm 17 is arranged in a cylinder 19, having a nozzle discharge 20 which opens into the hollowed portion of the casing 10, in which the cylinder plate 18 is rotatably mounted, as is clearly seen in Fig. 1 of the drawing. Between the worm 17 and nozzle 20 is a screen plate 21, through which the plastic material is fed, by the worm, into the chamber 22 of the nozzle in discharging the plastic material into one of a number of similar cylinders 23 in the plate 18, as these cylinders are brought into registering alinement with the nozzle 20. The plastic material in the prepared state is fed into the cylinder 19 through a hopper 24, communicating with the outer end of the worm 17, as is diagrammatically illustrated in Fig. 1 of the drawing.

It is preferred that the cylinders 23 be jacketed, as seen at 25, so that heating or cooling mediums may be circulated therethrough in any suitable manner to set, cure or harden the cast or moulded member, within the plate or the cavity formed in said cylinders, sufficiently to facilitate ejection of the cast or moulded pellet from the machine. In dealing with such plastic materials as dextrinized wood flour, it is desirable to circulate steam through the jackets 25 in order to plasticize the pellet, and to cure and harden the same.

Arranged in each cylinder 23 is a piston 26 having a rod 27 passing through a wall portion 28 of the plate 18 into air cylinders 29. The rods 27 have pistons 30 operating in said air cylinders.

The cylinder plate 18 has an outer wall 31 having centrally and axially thereof an air supply chamber 32, to which air is supplied from a suitable source through a pipe 33, a suitable coupling 34 being provided to compensate for the rotation of the cylinder plate 18. Extending from the chamber 32 are a plurality of radial air passages 35 extending to each air cylinder 29 and valves 36, transverse each of these passages in controlling supply of air to the respective cylinders. The valves 36 are controlled and actuated through a cam 37, the valve rods having rollers 38 operating on said cam.

Communicating with each cylinder 29 are adjustable pressure regulating valves 39, which may be regulated to control the back up of the pistons 26 and in gauging the dimensions of the pellet or other casting to be formed, particularly the dimensions longitudinally of the cylinder 23 and what might be said to be the length or, in some cases, the thickness of the resulting pellet. In other words, by increasing the back up pressure on the pistons 26, the length of the pellet will be reduced and by reducing this pressure, the length of the pellet increased. By adjusting the regulating valves 39, the size of the pellets may be controlled. In some instances, a positive stop will be desired and this is readily accomplished by simply inserting a sleeve in each of the cylinders 23 in back of the pistons 26. This would be particularly desired where a large production of pellets of a single size is desired. The cam 37 will be so constructed and timed with respect to the valves 36 as to open the valves 36 to admit air to the cylinders 29 in automatically ejecting a cast and cured pellet from a cylinder 23 into an outlet or discharge passage 40, formed in the casing 10. Extending through this chamber 40 is a conveyor 41 operated from suitably driven rolls 42 for delivering the pellet or other moulded product from the machine.

It will be understood that the open ends of the cylinders 23 are closed by the casing 10 except where the nozzle 20 communicates therewith and the discharge chamber 40 is located, so that the casting or moulded pellet will be confined in the cavity during the hardening, curing or setting stage and while the plate 18 is rotated from the extruding station to the ejector station. While these stations are indicated in Fig. 1 as directly opposed, this is only for purposes of simplified illustration and as a matter of fact, these two stations may be arranged in close proximity to each other. For example, looking at Fig. 2, and assuming that the plate is rotating in the direction of the arrow of said figure, cylinders 23, designated by the further numeral 43, may represent the casting or extruding station and the cylinder represented at 44 the ejector station.

It will be apparent that, while I have disclosed diagrammatically one method of controlling and actuating the pistons 26, in controlling the formation of the size of the mould cavity and ejecting the casting therefrom, that other controls may be employed. The principle of the method is to pressure inject a casting or moulding material into a cavity at what might be termed a casting or moulding station; then moving this cavity to an ejector station and ejecting the casting at the latter station by actuation of the back up piston forming part of the cavity. The method further comprises the use of a series of circumferentially spaced cylinders which are successively brought into registering alinement with the casting and ejector stations, so that while forming one casting or pellet, a preformed casting or pellet is ejected from the machine. By adjusting or otherwise regulating the back up pistons, at least one dimension of the resulting casting or pellet may be controlled. At this time it will also be understood that by using cylinder liners of different internal diameters and correspondingly changing the diameters of the pistons 26, another dimension of the casting or product may also be varied.

In Fig. 3 of the drawing is diagrammatically illustrated another type of casting or pellet, that is to say, one of cup shaped or hollow sleeve-like contour. In Fig. 3, 45 represents a casting or pellet, which may be said to be substantially thimble shaped in form. This pellet is arranged in its initial cast position at the outer end portion of a cylinder 46. The back up piston in this arrangement comprises a solid piston head 47 arranged on a rod 48 and a sleeve-like ejector piston 49. The piston 47 operates in the chamber 50 of the piston 49 in the ejector stroke of the piston 49 in stripping the casting 45 from the outer end 51 of the piston 47, which end is preferably tapered slightly to facilitate this stripping or ejector operation.

At the inner end of the cylinder 46 is an air admission port 52 for admitting air to actuate the piston 49 on the injection stroke and also to back up this piston against the pressure of the extruded casting material. At 53 is an air cylinder similar to the cylinders 29, in which is arranged a piston 54. Two air supply passages 55 and 56 communicate with opposed ends of the cylinder 53. Air is admitted through the passage 55 to back up the piston 47 and at the proper time, air is cut off from port 55 and admitted to port 56 to retract both pistons 47 and 49 after the ejection stroke thereof. Suitable adjustable controls will be provided to govern the backing up relationship of the pistons 47 and 49 in controlling the length of the cast member 45 and also in controlling the thickness of the closed end wall 57 of said member. In fact, in some cases, the resulting casting may simply be a sleeve with no end wall. Furthermore, the particular size and contour of the piston 47—51 may be varied to form any type and kind of core 58 within the resulting casting.

In connection with the question of contour of the cast member or pellet, it will also be apparent that the impression forming surface of the pistons 26 may be varied to form any desired contour on the resulting casting, the only essential feature being to construct the cavity in such manner as to facilitate the stripping operation. It will also be apparent that my invention is by no means limited to a machine of any particular size, nor to the number and arrangement of cavities employed.

It is also within the scope of my invention to not only use the pistons 26 and complementary pistons of Fig. 3 as back up pistons resisting the pressure of the extruded pressure injected material, but these pistons may, upon the sealing of the cavities immediately after passing the nozzle as at 20 and before setting, hardening or curing takes place, have additional pressure applied thereto by momentarily increasing the pressure applied to the back up piston. This mode of operation would, of course, not be applicable to the formation of castings which harden, solidify or become set after injection into the cavity, which in such instances is usually cooled by a water jacket.

Having fully described my invention, what I claim as new and desire to secure by Letters Patent is:

1. In casting machines of the class described, a rotatable member, said member having a plurality of cavities circumferentially spaced about the axis of said member, the axes of said cavities being parallel to the axis of said member, each cavity opening through one surface of said member, a piston element movably mounted in each cavity and forming an end wall in said cavity, a casting station, an ejector station, both of said stations being adjacent said one surface of said member, means at the casting station for pressure injecting casting material into the cavities when brought into registering alinement with said means, said piston element being moved in said cavities by the material injected into said cavities, and means individually controlling the movement of each piston element for determining the size of the casting.

2. In casting machines of the class described, a rotatable member, said member having a plurality of cavities circumferentially spaced about the axis of said member, the axes of said cavities being parallel to the axis of said member, each cavity opening through one surface of said member, a piston element movably mounted in each cavity and forming an end wall in said cavity, a casting station, an ejector station, both of said stations being adjacent said one surface of said member, means at the casting station for pressure injecting casting material into the cavities when brought into registering alinement with said means, said piston element being moved in said cavities by the material injected into said cavities, means individually controlling the movement of each piston element determining the size of the casting, said piston elements being adapted to eject castings from the cavities when in registering alinement with the ejector station, and means at the ejector station for receiving the ejected castings and for delivering the castings from the machine.

3. In casting machines of the class described, a rotatable member, said member having a plurality of cavities circumferentially spaced about the axis of said member, the axes of said cavities being parallel to the axis of said member, each cavity opening through one surface of said member, a piston element movably mounted in each cavity and forming an end wall in said cavity, a casting station, an ejector station, both of said stations being adjacent said one surface of said member, means at the casting station for pressure injecting casting material into the cavities when brought into registering alinement with said means, said piston element being moved in said cavities by the material injected into said cavities, means individually controlling the movement of each piston element for determining the size of the casting, a supplemental piston element in said cavities cooperating with the first element for controlling contour of the resulting castings, and independent means for controlling movement imparted to the supplemental piston element by injection of said casting material into the cavities.

4. In casting machines of the class described, a rotatable member, said member having a plurality of cavities circumferentially spaced about the axis of said member, the axes of said cavities being parallel to the axis of said member, each cavity opening through one surface of said member, a piston element movably mounted in each cavity and forming an end wall in said cavity, a casting station, an ejector station, both of said stations being adjacent said one surface of said member, means at the casting station for pressure injecting casting material into the cavities when brought into registering alinement with said means, said piston element being moved in said cavities by the material injected into said cavities, pneumatic means individually controlling each piston element in determining the size of the casting formed in each cavity, and means for controlling the pressure of said pneumatic means.

5. In casting machines of the class described, a rotatable member, said member having a plurality of cavities circumferentially spaced about the axis of said member, the axes of said cavities being parallel to the axis of said member, each cavity opening through one surface of said member, a piston element movably mounted in each cavity and forming an end wall in said cavity, a casting station, an ejector station, both of said stations being adjacent said one surface of said member, means at the casting station for pressure injecting casting material into the cavities when brought into registering alinement with said means, said piston element being moved in said cavities by the material injected into said cavities, pneumatic means individually controlling each piston element in determining the size of the casting formed in each cavity, means for controlling the pressure of said pneumatic means, said piston elements being adapted to eject the castings when in registering alinement with the ejector station, and means at the ejector station for receiving the ejected castings and for delivering the castings from the machine.

6. In an extrusion machine of the class described, a member having a cavity opening through one surface thereof, two back-up elements arranged in said cavity and partially forming the impression chamber of the cavity, independent pneumatic means controlling said elements, means at said surface and adapted to register with the opening of said cavity for pressure feeding casting material into the impression chamber of the cavity against the action of said pneumatic means, and means controlling the pressure of said pneumatic means, whereby the movement of said elements may be independently controlled in determining the size of the casting formed in the resulting impression chamber of said member.

7. In an extrusion machine of the class described, a member having a cavity opening through one surface thereof, two back-up elements arranged in said cavity and partially forming the impression chamber of the cavity, independent pneumatic means controlling said elements, means at said surface and adapted to register with the opening of said cavity for pressure feeding casting material into the impression chamber of the cavity against the action of said pneumatic means, means controlling the pressure of said pneumatic means, whereby the movement of said elements may be independently controlled in determining the size of the casting formed in the resulting impression chamber of said member, said member being movable to bring the cavity in alinement with an ejector station, and at least one of said elements being utilized to eject the casting from the impression chamber of said member at said station.

ROGER R. SMITH.